Sept. 24, 1946.  B. E. LENEHAN ET AL  2,408,218
ELECTRICAL MEASURING INSTRUMENT
Filed Nov. 10, 1943
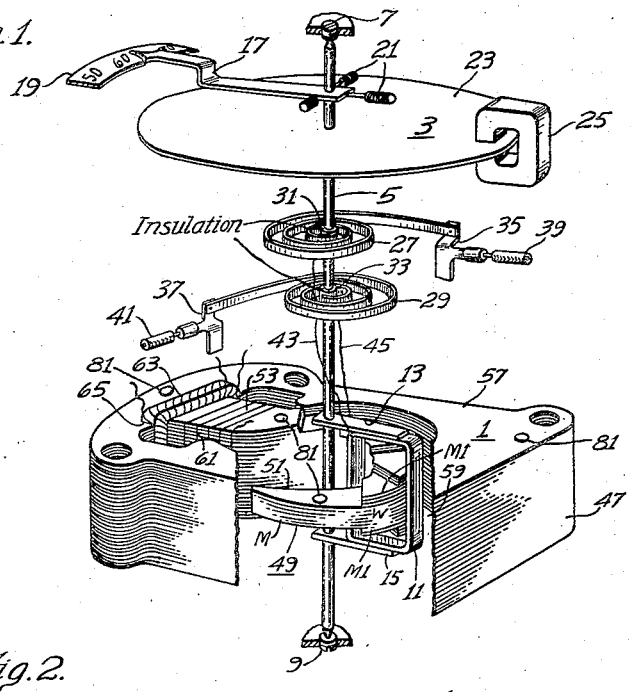
Fig.1.
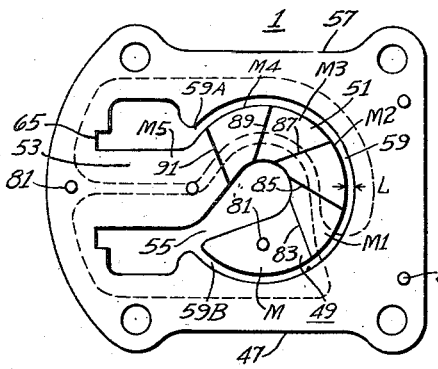
Fig.2.
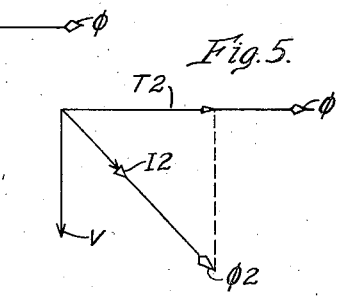
Fig.4.
Fig.5.
Fig.6.
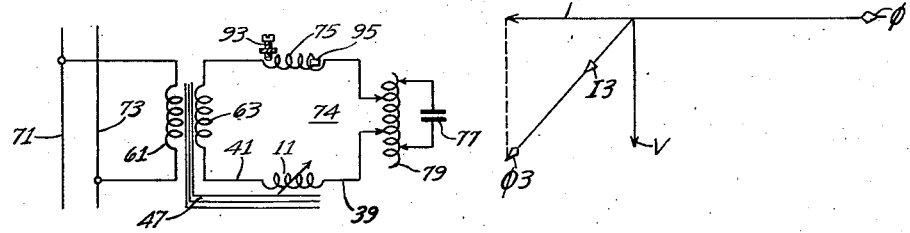
Fig.3.
WITNESSES:
INVENTORS
Bernard E. Lenehan
and George J. Wey.
BY
ATTORNEY Patented Sept. 24, 1946

2,408,218

UNITED STATES PATENT OFFICE 2,408,218

ELECTRICAL MEASURING INSTRUMENT

Bernard E. Lenehan, Bloomfield, and George J. Wey, East Orange, N. J., assignors to Westinghouse Electric Corporation, East Pittsburgh, Pa., a corporation of Pennsylvania Application November 10, 1943, Serial No. 509,728

7 Claims. (Cl. 172—245)

1

This invention relates to devices responsive to the frequency of an alternating electrical quantity and it has particular relation to frequency measuring instruments having long circular scales.

It has been proposed in the prior art that devices responsive to the frequency of an alternating-current quantity be provided with magnetic cores. For example, reference may be made to the MacGahan Patent 1,549,664 and to the book entitled "Electrical Instruments" by H. C. Turner, published by Instruments Publishing Company. However, in designing a frequency responsive device having a long circular scale, such as one having an angular length in excess of 200°, a number of problems are presented. Among these problems are the provision of adequate sensitivity and torque throughout the range of indication of the device while avoiding too great a spread between maximum torque and minimum torque. In addition, it is desirable that the device be of simple construction, readily assembled and readily serviced.

In accordance with the invention, a frequency responsive device, such as an indicating frequency meter, is provided with means responsive to an alternating current electrical quantity to be measured for establishing a magnetic field and for inducing a voltage in a coil having a side disposed for movement through the magnetic field. The coil is included in an electrical circuit having inductance and capacitance, the value of the inductance being dependent on the position of the coil with respect to the magnetic field. The electrical circuit is so proportioned that by proper positioning of the coil the electrical circuit may be brought into resonance for each frequency to which the instrument is designed to respond. With such a construction, the coil seeks a position such that the electrical circuit is in resonance for the specific frequency of the aforesaid alternating electrical quantity. In order to decrease the ratio of the maximum to the minimum torque exerted on the coil, provision is made for introducing into the resonant electrical circuit an auxiliary voltage having the same frequency as that of the alternating electrical quantity to be measured.

For establishing the required magnetic paths, the instrument includes a magnetic structure formed of laminations. Each of the laminations includes a hook-shaped portion providing a substantially annular core and an outer magnetic element spaced from the annular core to define therewith a substantially annular air gap. The coil has a side positioned for rotation through this air gap and is so proportioned that it may be inserted and removed with respect to the magnetic structure through the channel defined by the tip of the hook-shaped portion.

It is, therefore, an object of the invention to provide an improved device responsive to the frequency of an alternating electrical quantity.

It is a further object of the invention to provide a frequency measuring instrument comprising means responsive to an alternating electrical quantity to be measured for establishing a magnetic field wherein a coil is disposed for movement and for inducing a voltage in the coil; an electrical circuit having inductance and capacitance and including the electrical coil; and means for introducing an auxiliary voltage in the electrical circuit.

It is a still further object of the invention to provide an improved magnetic core for a frequency measuring instrument.

Other objects of the invention will be apparent from the following description taken in conjunction with the accompanying drawing, in which:

Figure 1 is a view in perspective with parts broken away of a frequency measuring instrument embodying the invention.

Fig. 2 is a view in top plan of a magnetic structure suitable for the instrument of Fig. 1.

Fig. 3 is a schematic view showing circuit connections suitable for the instrument of Fig. 1; and Figs. 4, 5 and 6 are simplified vector representations of electrical conditions which may occur in the instrument of Fig. 1.

Referring to the drawing, Fig. 1 shows a frequency measuring instrument comprising a stator assembly 1 and a rotor assembly 3. The rotor assembly includes a shaft 5 having pivots at its ends which are rotatably received in suitable bearing screws 7 and 9. A coil 11 is suitably secured to the shaft 5. In the specific embodiment of Fig. 1, the coil 11 is cemented to brackets 13 and 15 which are secured to the shaft 5.

The shaft 5 also supports a pointer 17 which has an end positioned for movement adjacent a circular scale 19. It will be noted that the pointer 17 and the coil 11 are on opposite sides of the shaft 5. Consequently, the pointer 17 balances, at least in part, the coil 11. If the pointer slightly overbalances the coil, adjustable balance weights 21 may be secured to the shaft 5, as shown in Fig. 1.

Rotation of the rotor 3 is damped by means of an electroconductive damping disk 23 secured to the shaft 5 and formed of a material such as aluminum. This disk 23 rotates between the poles of a permanent magnet 25 to damp rotation of the shaft 5 in a manner well understood in the art.

Connections to the coil 11 are made through flexible conductor strips 27 and 29 which have their inner ends secured respectively to insulating collars 31 and 33 secured to the shaft 5. The outer ends of the spiral conductor strips 27 and 29 are soldered or otherwise secured to lugs 35 and 37 which are fixed with respect to the stator 1. Connections from external electrical elements to the lugs may be effected through suitable conductors 39 and 41. The coil 11 is connected through conductors 43 and 45, respectively, to the inner ends of the conductor strips 27 and 29. As shown in Fig. 1, the spiral conductor strips 27 and 29 are wound about the shaft 5. Although the conductor strips are extremely flexible, they have a little resilience. Since the shaft 5 is designed for a large angular movement, such as one in excess of 200°, it is convenient to adjust the conductor strips so that they are unstressed when the coil 11 is adjacent a position wherein the instrument develops a minimum torque in response to a deviation of the frequency being measured from the indicated value. In a specific instrument designed in accordance with the invention, the conductor strips were positioned to be unstressed when the pointer indicated approximately two-thirds of the full scale value.

The stator includes a magnetic structure 47 for establishing a magnetic field within which a portion of the coil 11 is disposed for rotation and for directing magnetic flux through the coil 11. The magnetic structure 47 comprises a hook-shaped magnetic inner part 49 having a hook portion 51 and a shank portion 53. It will be observed that the hook portion 51 provides a substantially annular magnetic core having a channel 55 therein (see Fig. 2). The magnetic structure 47 includes further an outer magnetic element or portion 57 which surrounds and is spaced from the hook portion or annular magnetic core 51 to define therewith an annular air gap 59. This air gap has a width W (Fig. 1) and a length L (Fig. 2). By inspection of Fig. 1, it will be observed that the coil 11 links the annular magnetic core 51 and has a side disposed for movement through the annular air gap 59. It should be observed further that the coil 11 is proportioned to pass through the channel 55 (Fig. 2) in response to movement of the rotor in an axial direction. This permits the coil to be inserted in operative position or to be removed therefrom without disturbing the magnetic structure 47.

For energizing the instrument illustrated in Fig. 1, a winding 61 surrounds the shank portion 53 of the magnetic structure 47. When an electrical current is passed through the winding 61, magnetic flux is directed in series through the shank portion 53, the annular magnetic core 51 and the air gap 59, as shown by dotted lines in Fig. 2. Since a portion of this magnetic flux passes through the coil 11, a voltage is induced in the coil. Furthermore, a side of the coil 11 is disposed for movement through the magnetic field produced by the magnetic flux crossing the annular air gap 59. For a purpose hereinafter pointed out, an auxiliary winding or coil 63 is positioned on the shank portion 53. If desired, the magnetic structure 47 may include a notch 65 for receiving the auxiliary winding 63.

It is desirable at this point to note that the self-inductance of the coil 11 depends on its position with reference to the magnetic structure 47. This may be explained with reference to Fig. 2, if it is assumed first that the coil is positioned adjacent the end 59A of the annular air gap 59. When the coil 11 is so positioned, substantially all flux passing there through is distributed over substantially the entire air gap 59. Since the air gap has a large cross section the reluctance offered to the magnetic flux is comparatively small and the self-inductance of the coil 11 is large. On the other hand, if the coil is positioned adjacent the opposite end 59B of the air gap, magnetic flux passing through the coil passes through an extremely small portion of the annular air gap. Consequently, the reluctance offered to such magnetic flux is comparatively high and the self-inductance of the coil is substantially smaller than that of the coil when the coil is positioned adjacent the end 59A of the air gap. At intermediate positions of the coil, the self-inductance of the coil has intermediate values.

The variation in self-inductance of the coil 11 as it moves through the air gap 59 may be controlled by the shape of the air gap. For example, if it is desired that the self-inductance of the coil decrease at a more rapid rate as the coil moves from the end 59A to the end 59B of the air gap, the magnetic structure 47 may be constructed to provide an air gap 59 having a length L which increases from a predetermined value adjacent the end 59A to a larger value adjacent the end 59B. Alternatively, the magnetic structure may be constructed to provide an annular air gap having a uniform length L but having a width W which decreases from a predetermined value adjacent the end 59A to a smaller value adjacent the end 59B of the air gap. The desirability of such variations in the air gap will be discussed below.

Suitable electrical connections for the instrument of Fig. 1 are illustrated in Fig. 3. In Fig. 3, a pair of conductors 71 and 73 represent an electrical circuit having an alternating voltage thereacross. The winding 61 is connected across the circuit for energization in accordance with the aforesaid alternating voltage. Energization of the winding 61 establishes a magnetic field for the coil 11 and also directs magnetic flux through the coil 11 to induce an alternating voltage therein. The coil 11 is included in an electrical circuit 74 having inductance represented by the coil 11 and an inductance coil 75 and having a capacitance represented by a capacitor 77. To decrease the size of the capacitor 77 required, the capacitor is connected to the electrical circuit through an auto-transformer 79, the high voltage side of the auto-transformer being across the capacitor 77. To facilitate calibration, one or more of the connections to the auto-transformer 79 are through adjustable taps.

In response to the voltage induced in the coil 11, a current flows through the electrical circuit 74. However, the voltage induced in the coil 11 is dependent on the position of the coil with respect to the magnetic structure 47. Referring again to Fig. 2, when the coil is adjacent the end 59A of the air gap substantially all the magnetic flux passing through the air gap also passes through the coil. Consequently, a substantial voltage is induced in the coil 11. However, when the coil 11 is adjacent the end 59B of the air gap, very little of the magnetic flux passing through the air gap passes through the coil. Therefore, the voltage induced therein is comparatively small. This difference in voltage, if large, is objectionable for the reason that to provide adequate torque when the coil is adjacent the end 59B of the annular air gap, an extremely large torque is applied to the coil when the coil is adjacent the end 59A of the air gap. A large torque may result in excessive stress and vibration in the coil and associated portions of the instrument.

To decrease the variation of current in the electrical circuit 74 resulting from a variation in the position of the coil 11 with respect to the magnetic structure 47, an auxiliary voltage is introduced into the electrical circuit. This voltage may be obtained directly from the conductors 71 and 73 through a suitable phase control device for maintaining the auxiliary voltage substantially in phase with the voltage induced in the coil 11. Preferably, the auxiliary voltage is introduced by means of the auxiliary winding 63 which is inductively coupled to the winding 61. Since the same magnetic flux passes through the windings 63 and 11, the voltages induced therein are in phase. The auxiliary voltage induced in the winding 63 is substantially independent of the position of the coil 11 with respect to the magnetic structure 47. For this reason, the ratio of the maximum to the minimum torque applied to the coil 11 may be held to a reasonably small value.

The operation of the measuring instrument illustrated in Fig. 1 and connected as shown in Fig. 3, may be considered with reference to the partial vector representations of Figs. 4, 5 and 6. When the winding 61 is connected to the circuit represented by the conductors 71 and 73, magnetic flux flows in the magnetic structure 47. This magnetic flux is represented in Figs. 4, 5 and 6 by the vector $\phi$. Let it be assumed that the voltage across the winding 61 is an alternating voltage having a frequency of 60 cycles per second. Since the coils 11 and 63 are inductively coupled to the winding 61, the alternating flux $\phi$ in the magnetic structure 47 induces voltages in the coils 11 and 63 which are in phase with each other. The sum of these two voltages is represented in Figs. 4, 5 and 6 by the vector V which lags the flux $\phi$ by an angle of 90°. The voltage V produces a flow of current in the electrical circuit 74. The parts are so proportioned that if the pointer 17 indicates a frequency of 60 cycles per second on the scale 19, as shown in Fig. 1, the electrical circuit 74 is resonant at a frequency of 60 cycles per second. Under these conditions, the electrical circuit 74 offers an impedance to the flow of current which is represented only by the resistance of the circuit and the current which flows in the circuit is in phase with the voltage V. This current is represented in Fig. 4 by the vector I. In flowing through the coil 11, the current I produces a magnetic flux which is represented in Fig. 4 by the vector $\phi 1$. It will be noted that the vectors $\phi$ and $\phi 1$ are in quadrature. Consequently no torque is applied to the coil 11 and the pointer 17 continuously indicates a frequency of 60 cycles per second.

Let it be assumed next that the frequency drops suddenly from a value of 60 cycles per second to a value of 50 cycles per second. Since the electrical circuit 74 initially is resonant for a frequency of 60 cycles per second, the circuit offers at a frequency of 50 cycles per second a substantial capacitive impedance to the flow of current. In response to the voltage V, a leading current I2 (Fig. 5) flows through the circuit 74. In flowing through the coil 11, the current I2 produces a magnetic flux $\phi 2$. The component of the magnetic flux $\phi 2$, which is in phase with the magnetic flux $\phi$, represents a torque T2 which is applied to the coil 11. In response to this torque the coil 11 moves until the pointer 17 indicates a frequency of 50 cycles per second on the scale 19. At this point, the inductance of the coil 11 has changed to a value which makes the electrical circuit 74 resonant at a frequency of 50 cycles per second and the vector relationships again are similar to those illustrated in Fig. 4.

Let it be assumed that the instrument of Fig. 1 is indicating a frequency of 60 cycles per second and that the frequency applied to the winding 61 increases suddenly to a value of 70 cycles per second. Since the electrical circuit 74 initially is resonant for a frequency of 60 cycles per second, the circuit for a frequency of 70 cycles per second offers a substantial inductive impedance to the flow of current. Consequently, in response to the voltage V a current I3 flows through the circuit. The current as shown in Fig. 6 lags the voltage V, and produces a magnetic flux $\phi 3$ when flowing through the coil 11. The component of the magnetic flux $\phi 3$ which is projected on the line of the magnetic flux $\phi$ represents a torque T3 acting on the coil 11. This torque is directed oppositely to the torque T2 of Fig. 5 and urges the pointer 17 up-scale to a position indicating a frequency of 70 cycles per second. The resulting movement of the coil 11 reduces the inductance of the coil 11 to a value which makes the electrical circuit 74 resonant at a frequency of 70 cycles per second. Therefore, with the pointer 17 indicating a frequency of 70 cycles per second, the vector relations in the circuit 74 are similar to those represented in Fig. 4 and the pointer 17 remains stationary. From this brief review of the operation of the instrument, it will be appreciated that the coil 11 always seeks a position such that the electrical circuit 74 is brought into resonance for the frequency of the alternating voltage applied to the winding 61.

The scale distribution of the instrument is determined by the rate at which the self-inductance of the coil 11 changes in response to movement of the coil with respect to the magnetic structure 47. To provide a linear scale, the annular magnetic core 51 is tapered as shown in Fig. 1. This tapering of the annular magnetic core is such that the cross section of the annular magnetic core and the width of the air gap decrease from predetermined values adjacent the end 59A of the air gap to smaller values adjacent the end 59B of the air gap.

The magnetic structure 47 may be constructed in any suitable manner from a soft magnetic material, such as a good grade of soft iron. If desired, the material employed for the magnetic structure may be similar to that shown in Patent No. 1,807,021, of T. D. Yensen, issued May 26, 1931, which is available on the market under the trade name "Hipernik." The material disclosed in this patent is a low hysteresis loss heat-treated magnetic alloy comprising iron and nickel in approximately equal proportions. Conveniently, the magnetic structure 47 may be formed from a plurality of magnetic laminations M, M1, M2, M3, M4, M5 which are attached to each other in any suitable manner as by means of rivets 81. The laminations all may be of substantially the same configuration but certain of the laminations M1 have their tips cut off along the line 83 (Fig. 2). Other laminations M2, M3, M4, M5 have their tips cut off along the lines, respectively, 85, 87, 89 and 91. This provides an annular magnetic core 51 which tapers to provide the desired rate of change of the inductance of the coil 11 in its rotation through the air gap. It will be observed that the lines 83, 85, 87, 89 and 91 are not radial with respect to the shaft 5. As clearly shown in Fig. 2, these lines are inclined to provide a gradual change in cross section of the core as the coil 11 moves thereacross. The laminations may be assembled in any desired sequence. Preferably, one or more of the laminations M1 are applied to each face of a stack of the laminations M. The laminations M2, M3, M4 and M5 are then applied successively to each face of the resulting stack to provide the stepped formations illustrated in Fig. 1 on each side of the laminations M. This design assures a magnetic structure of substantial rigidity.

The current flowing through the electrical circuit 74 depends on the voltage applied to the winding 61 and on the characteristics of the electrical circuit. It is desirable that a substantial portion of the inductance in the electrical circuit 74 be independent of the current flowing in the circuit. To this end, the inductance 75 preferably is substantially an air core inductance. Such an inductance substantially eliminates errors resulting from changes in the voltage applied to the winding 61.

As previously explained, the calibration of the instrument may be controlled by adjusting the ratio of the primary turns of the auto-transformer 79 to the second turns thereof. In addition, a fine adjustment may be provided by positioning a magnetic screw 93 for movement into and out of the magnetic field of the inductance coil 75. By an adjustment of the screw 93, the inductance of the coil 75 may be varied to calibrate the electrical circuit.

In practice, it is difficult to provide a capacitor 77 which has no temperature error. As a general rule, a commercial capacitor has a value of capacitance which increases with temperature. This increase may be compensated by a positioning in the magnetic field of the inductance coil 75, a magnetic element 95 having a substantial negative temperature coefficient of permeability. As well understood in the art, a magnetic element having such a coefficient may be formed of an iron alloy containing 30% nickel. Such alloys are known as temperature compensator alloys.

As previously explained, the inductance coil 75 is essentially an air core inductance. The amount of iron added by the screw 93 and the element 95 is small and the inductance coil 75 has, to a substantial extent, an inductive reactance which is independent of the value of the current flowing therethrough.

Although the invention has been described with reference to certain specific embodiments thereof, numerous modifications are possible. Therefore, the invention is to be restricted only by the appended claims as interpreted in view of the prior art.

We claim as our invention:

1. In a device responsive to the frequency of an alternating electrical quantity, a magnetic structure having an air gap, a coil having a portion positioned in said air gap, means mounting said coil for movement relative to said magnetic structure to direct said portion through said air gap, means associated with said magnetic structure and responsive to the alternating quantity to be measured for directing a magnetic flux through said air gap and through said coil, said magnetic structure being configured to effect a change in inductance of said coil as said coil moves through said air gap, a circuit containing inductance and capacitance, said circuit including said coil and being proportioned to be resonant for the range of frequencies to which said device is designed to respond, whereby magnetic flux passing through said coil causes current to flow in said circuit having a phase relationship relative to the magnetic flux in said air gap which is dependent on the deviation of the frequency of the alternating quantity to be measured from the value corresponding to the position of said coil relative to said magnetic structure, a substantial portion of the inductance in said circuit having a non-magnetic core, and auxiliary means for energizing said circuit in accordance with the alternating quantity to be measured.

2. In a device responsive to the frequency of an alternating electrical quantity, a magnetic structure comprising a substantially annular magnetic core and a magnetic element spaced from said annular magnetic core to define therewith a substantially annular air gap, a coil linked with said annular magnetic core, said coil having a portion positioned in said air gap, means mounting said coil for rotation relative to said magnetic structure to carry said portion through the air gap, said magnetic structure being configured to change the inductance of said coil as the coil rotates with respect to said magnetic structure, means associated with said magnetic structure for directing through said air gap and through said coil alternating magnetic flux dependent on an alternating quantity to be measured, whereby an alternating voltage is induced in said coil, a circuit containing capacitance and inductance, said circuit including said coil, whereby said voltage produces a flow of current through said circuit having a phase relationship relative to said magnetic flux which is dependent on the deviation of said circuit from resonance, and auxiliary means for introducing a voltage in said circuit dependent on the alternating quantity to be measured.

3. In a device responsive to the frequency of an alternating electrical quantity, a magnetic structure comprising a substantially annular magnetic core, a magnetic element spaced from said annular magnetic core to define therewith a substantially annular air gap, and a magnetic member connecting said magnetic core to said magnetic element, said magnetic core having a channel extending from the interior to the exterior thereof adjacent said magnetic member, a coil linked with said annular magnetic core, said coil having a portion positioned in said air gap, means mounting said coil for rotation relative to said magnetic structure to carry said portion through the air gap, said magnetic structure being configured to change the inductance of said coil as the coil rotates with respect to said magnetic structure, and a winding associated with said magnetic structure and effective when suitably energized for directing through said air gap and through said coil alternating magnetic flux dependent on an alternating quantity to be measured, whereby an alternating voltage is induced in said coil, a circuit containing capacitance and inductance, said circuit including said coil; whereby said voltage produces a flow of current through said circuit having a phase relationship relative to said magnetic flux which is dependent in the deviation of said circuit from resonance, said coil being proportioned for removal from said magnetic structure through said channel.

4. In a device responsive to the frequency of an alternating electrical quantity, a magnetic structure comprising a substantially annular magnetic core having a channel extending from the interior to the exterior thereof, a magnetic element substantially surrounding said annular magnetic core but spaced therefrom to define an annular air gap therebetween, and a magnetic member adjacent said channel for connecting said annular magnetic core to said magnetic element, said magnetic structure being configured to provide the annular air gap with different reluctances at various angular positions around the axis of the air gap, a winding associated with said magnetic structure, said winding when energized in accordance with said electrical quantity being effective for directing alternating magnetic flux through said annular magnetic core and said air gap, a coil linked with said annular magnetic core, means mounting said coil for rotation substantially about the axis of said annular magnetic core, and a circuit having capacitance and inductance, said circuit including said coil and being proportioned to be resonant for the range of frequencies to which said device is designed to respond.

5. In a device responsive to the frequency of an alternating electrical quantity, a magnetic structure comprising a substantially annular magnetic core having a channel extending from the interior to the exterior thereof, a magnetic element substantially surrounding said annular magnetic core but spaced therefrom to define an annular air gap therebetween, and a magnetic member adjacent said channel for connecting said annular magnetic core to said magnetic element, said annular magnetic core having a radial cross-section which differs at successive points around said core, a winding associated with said magnetic structure for directing magnetic flux through said annular magnetic core and said air gap, a coil linked with said annular magnetic core, said coil being proportioned to be inserted in and removed from said magnetic structure through said channel, means mounting said coil for rotation substantially about the axis of said annular magnetic core, and a circuit having capacitance and inductance, said circuit including said coil and being proportioned to be resonant for the range of frequencies to which said device is designed to respond, and an auxiliary winding linked with magnetic flux produced by said first-named winding, said auxiliary winding being included in said circuit.

6. In a device responsive to the frequency of an alternating electrical quantity, a magnetic structure comprising a plurality of aligned magnetic laminations, each of said laminations comprising a hook-shaped magnetic inner part having a shank portion and having a hook portion terminating in a tip, a magnetic outer part surrounding and spaced from a substantial portion of the hook portion to define therewith an arcuate air gap, each lamination forming a path for magnetic flux wherein said inner part, said air gap and said outer part are in series, certain of said laminations having tips terminating short of the tips of other of said laminations to provide a resultant hook portion varying in cross-section, a coil linked with the resultant hook portion, and means mounting said coil for rotation relative to said magnetic structure.

7. In a device responsive to the frequency of an alternating electrical quantity, a magnetic structure comprising a plurality of aligned magnetic laminations, each of said laminations comprising a hook-shaped magnetic inner part having a shank portion and having a hook portion terminating in a tip, a magnetic outer part surrounding and spaced from a substantial portion of the hook portion to define therewith an arcuate air gap, each limination forming a path for magnetic flux wherein said inner part, said air gap and said outer part are in series, certain of said one of laminations having tips terminating short of the tip of said last-named lamination to provide a resultant hook portion varying in cross-section, a coil linked with the resultant hook portion, means mounting said coil for rotation relative to said magnetic structure, and means positioned adjacent the shank portions of said laminations for directing magnetic flux through said path formed by each of said laminations.

BERNARD E. LENEHAN.
GEORGE J. WEY.